United States Patent [19]

Kaneko et al.

[11] Patent Number: 5,262,868
[45] Date of Patent: Nov. 16, 1993

[54] DIGITAL ELECTRONIC STILL CAMERA WITH FUNCTION ALARMING LOW VOLTAGE OF BUILT-IN BATTERY OF MEMORY CARD

[75] Inventors: Kiyotaka Kaneko; Hiroshi Shimaya; Izumi Miyake, all of Tokyo, Japan

[73] Assignee: Fuji Photo Film Co., Ltd., Kanagawa, Japan

[21] Appl. No.: 819,813

[22] Filed: Jan. 13, 1992

[30] Foreign Application Priority Data

Jan. 14, 1991 [JP] Japan .................................. 3-16055

[51] Int. Cl.⁵ ........................ H04N 5/225; H04N 5/30
[52] U.S. Cl. .................................. 358/209; 358/909; 358/335
[58] Field of Search ............... 358/209, 909, 335, 906; 340/636; 360/33.1, 35.1, 14.1

[56] References Cited

U.S. PATENT DOCUMENTS

| | | | |
|---|---|---|---|
| 4,622,544 | 11/1986 | Bially et al. | 340/636 |
| 4,827,347 | 5/1989 | Bell | 358/224 |
| 5,018,017 | 2/1991 | Sasaki et al. | 358/209 |
| 5,091,787 | 2/1992 | Watanabe et al. | 358/209 |

FOREIGN PATENT DOCUMENTS

| | | | |
|---|---|---|---|
| 366474A | 5/1990 | European Pat. Off. | 5/225 |
| 62-131673 | 6/1987 | Japan | 5/225 |
| 1-44556 | 2/1989 | Japan | 12/06 |
| 2-224473 | 9/1990 | Japan | 5/225 |

Primary Examiner—Michael T. Razavi
Assistant Examiner—Tuan V. Ho

[57] ABSTRACT

A memory card has a volatile semiconductor memory for storing therein image data, a built-in battery as a backup power for preserving the image data in the volatile semiconductor memory, and a non-volatile memory for storing therein data related to an alarm of a decrease in a voltage of the built-in battery. When the memory card is loaded on the digital, electronic, still camera, the data concerning the alarm state is read from the loaded memory card and the voltage value of the battery is sensed. If the value of the battery voltage thus determined is less than a threshold voltage attained from the data read from the memory card, an alarm is notified.

2 Claims, 3 Drawing Sheets

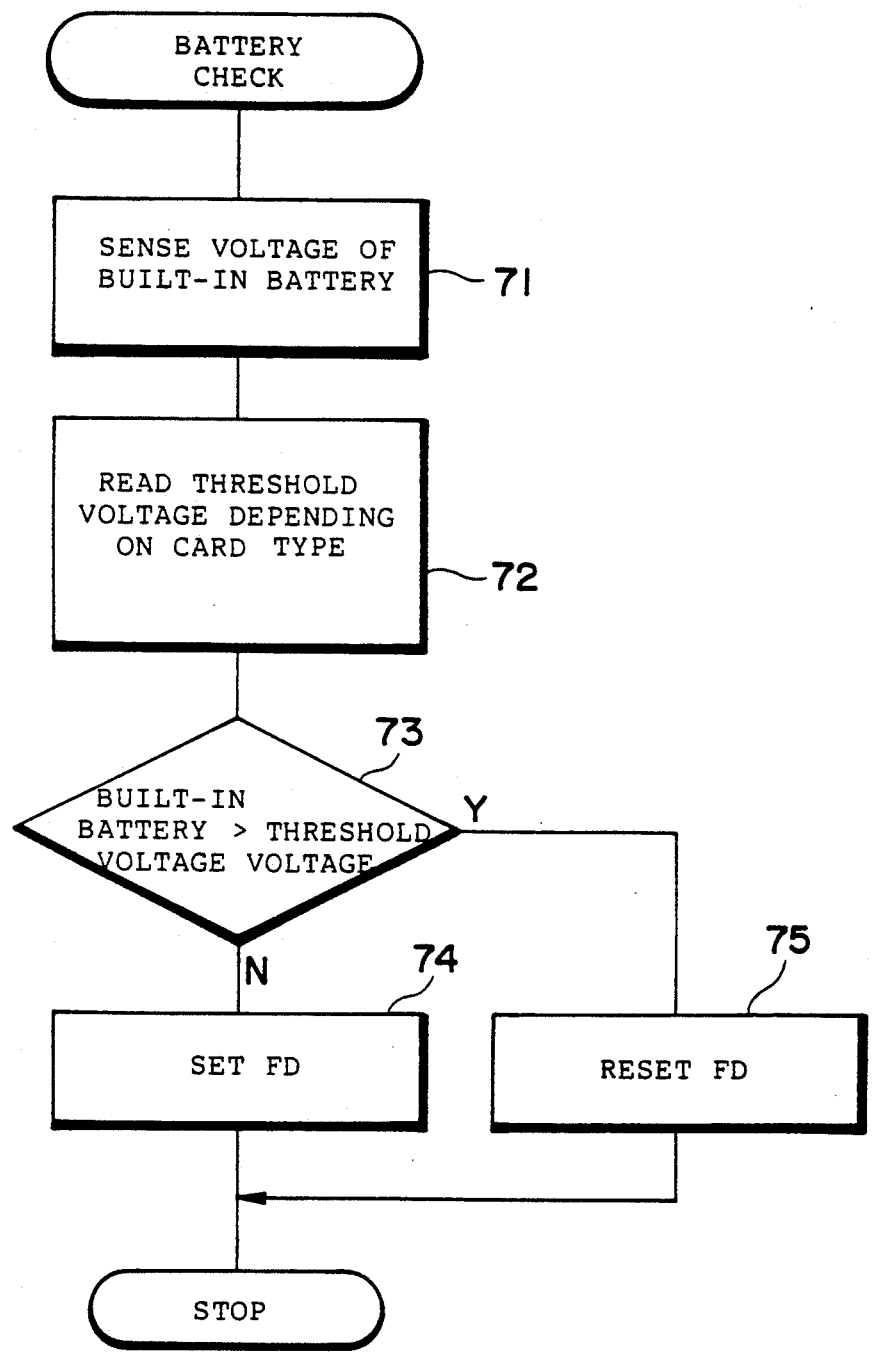

DIGITAL ELECTRONIC STILL CAMERA WITH FUNCTION ALARMING LOW VOLTAGE OF BUILT-IN BATTERY OF MEMORY CARD

BACKGROUND OF THE INVENTION

1. Field of the Invention

The present invention relates to a digital, electronic, still camera for use with a memory card including a volatile semiconductor memory and a battery built therein for a data backup preserving data stored in the memory wherein image data representing an image of a subject shot by the camera is recorded in the volatile semiconductor memory.

2. Description of Related Art

A digital, electronic, still camera (or a digital still, video camera) is used to shoot a subject by a solid-state electronic imaging element such as a charge coupled device so as to attain a video signal thereof. The video signal is then converted into digital data to be recorded in a memory card; more specifically, in a semiconductor memory disposed therein for storing image data. The semiconductor memory card is implemented by a volatile memory such as a random access memory in most cases and hence inevitably requires an operation power to be supplied thereto. To this end, the memory card is provided with a memory backup battery (a cell) built therein. When the battery is used up, image data accumulated in the memory is lost. Consequently, it is essential to conduct a voltage check for a voltage of the battery.

On the other hand, there have been broadly used digital, electronic, still cameras in various fields and plural kinds of memory cards have been put on the market. This implies that the number of kinds of available memory cards will be increased in the future. Depending on a selected memory card type, there are respectively determined, for example, the type, capacity, access time, manufacturer, pin arrangement, and production date of the main memory and kinds of electronic apparatuses for use therewith. To cope with such situations, it has been proposed, for example, in the Japanese Patent Laid-Open No. 64-44556/1989, to beforehand load a non-volatile memory of a memory card with data related to compatibility thereof as listed above.

To conduct a (battery) check on a memory backup battery disposed in a memory card, a threshold voltage is beforehand decided as a reference of judgement for availability and replacement of the battery. The threshold voltage may possibly vary depending on the memory card type. Namely, when only a kind of threshold voltage is available, the battery check cannot be achieved for many kinds of memory cards. Moreover, there has not been materialized a digital, electronic, still camera which can sense a decrease in the built-in battery voltage for many kinds of memory cards.

SUMMARY OF THE INVENTION

It is therefore a primary object of the present invention to enable a battery check to be accomplished which depends on a kind of a memory card used.

In accordance with a first aspect of the present invention, a digital, electronic, still camera with a function alarming a low voltage of a memory card built-in battery includes memory card installation (load) sensing means for sensing an installation (loading) of a memory card having a volatile semiconductor memory for storing image data, a built-in battery as a data backup power for preserving the image data stored in said volatile semiconductor memory and a non-volatile memory for storing data related to an alarm of a decrease in a voltage of said built-in battery, voltage sensing means responsive to the sensing of the installation by said memory card installation sensing means for sensing a voltage of said built-in battery of said installed memory card, data reading means responsive to the sensing of the installation by said memory card installation sensing means for reading data stored in said non-volatile memory of said memory card, comparing means for comparing the built-in battery voltage sensed by said voltage sensing means with a threshold voltage attained from the data read by said data reading means, and alarming means responsive to when a result of the comparison of said comparing means indicates that said built-in battery voltage is lower than the threshold voltage for alarming a voltage reduction of said built-in battery.

In accordance with the first aspect of the present invention, the non-volatile memory of the memory card is loaded with data associated with the alarm condition for the reduced voltage of the built-in battery of the memory card. When the memory card is attached onto the digital, electronic, still camera, the data concerning the alarm state for the reduced battery voltage is read from the installed memory card and the voltage value of the battery is sensed. If the value of the battery voltage thus determined is less than a threshold voltage attained from the data read from the memory card, an alarm is notified.

In accordance with the first aspect of the present invention, when the memory card is mounted on the digital, electronic, still camera, a battery check is accomplished on the battery disposed for a memory backup purpose in the memory card. Consequently, since the state of the built-in battery is detected prior to initiation of a shooting operation of the camera, it is possible to prevent occurrence of an accident such as a loss of the obtained data due to an insufficient voltage of the battery.

Moreover, since the memory card is in advance loaded with threshold data for the battery check depending on the kind of the memory card, the voltage check can be achieved with a threshold voltage according to the kind of the memory card. Furthermore, this camera can conduct a battery voltage check on built-in batteries of plural kinds of memory cards.

In accordance with a second aspect of the present invention, a digital, electronic, still camera with a function alarming a low voltage of a memory card built-in battery includes memory card installation sensing means for sensing an installation therein of a memory card having a volatile semiconductor memory for storing image data, a built-in battery as a backup power for preserving the image data stored in said volatile semiconductor memory and a non-volatile memory for storing data related to said memory card, voltage sensing means responsive to the sensing of the installation by said memory card installation sensing means for sensing a voltage of said built-in battery of said installed memory card, data reading means responsive to the sensing of the installation by said memory card installation sensing means for reading data stored in said non-volatile memory of said memory card, storing means for storing therein auxiliary threshold voltage for an alarm of a decrease in the built-in battery voltage of said memory card, judging means for deciding whether or not the data read by said data reading means from said non-volatile memory of said installed memory card contains threshold data for an alarm of the decrease in the built-in battery voltage of said memory card, comparing means operative to when it is judged that the threshold data is present for comparing a threshold voltage attained from the threshold data with the the built-in battery voltage sensed by said voltage sensing means and operative to when it is judged that the threshold data is absent for comparing the auxiliary threshold voltage with the the built-in battery voltage sensed by said voltage sensing means, and alarming means responsive to when a result of the comparison of said comparing means indicates that the built-in battery voltage is lower than the threshold voltage or the auxiliary threshold voltage for alarming a voltage reduction of said built-in battery.

In accordance with the second aspect of the present invention, in the non-volatile memory of the memory card, data related to the memory card such as data of the compatibility is stored in advance. When the memory card is loaded to the digital, electronic, still camera, the data is read from the non-volatile memory and the voltage of the battery built in the memory card is read therefrom. If the data obtained from the memory card includes threshold data for an alarm of a voltage reduction of the memory card battery, a threshold voltage determined from the threshold data is compared with the sensed battery voltage. Otherwise, the auxiliary threshold voltage beforehand set in the memory of the camera is compared with the sensed battery voltage.

The memory of the still camera is desirably loaded with threshold voltages of plural kinds of memory cards in advance. In operation, when a memory card is installed in the camera, a type thereof is determined depending on data read from the memory card so as to use a threshold voltage associated with the card type in the battery check.

In either situation, if the sensed battery voltage is less than the threshold voltage or the auxiliary threshold voltage, an alarm of the reduced voltage is notified.

Also in accordance with the second aspect, when a memory card is mounted on the digital, electronic, still camera, the battery check is carried out for a voltage of the battery of the memory card. Consequently, the memory card can be beforehand guaranteed for the shooting operation of the camera.

In addition, the battery check can be accomplished depending on the type or kind of the memory card mounted on the camera.

Particularly, in accordance with the second aspect of the present invention, at least data representing kinds of memory cards need only be stored in the non-volatile memory of the memory card. In this case, without storing the threshold data above in advance, the battery check can be achieved with the threshold voltages preset in the memory of the camera.

In accordance with a third aspect of the present invention, there is provided a digital, electronic, still camera in which image data of an image of a subject shot by said camera is recorded in a memory card having a built-in battery disposed for a data backup purpose comprising storing means for storing therein a plurality of threshold voltages associated with plural kinds of memory cards, voltage sensing means responsive to an installation of said memory card in said camera for sensing a voltage of said built-in battery of said memory card, judging means for determining a kind of said memory card installed in said camera, threshold voltage reading means for reading from said storing means one of a plurality of threshold voltages associated with the determined kind of the memory card, comparing means for comparing the one threshold voltage thus read by said threshold voltage reading means with the battery voltage sensed by said voltage sensing means, and alarming means operative to when a result of the comparison conducted by said comparing means indicates that the voltage of the built-in battery of the card is lower than the threshold voltage for issuing an alarm of a low voltage of the built-in battery.

In accordance with the third aspect of the present invention, the storing means of the digital, electric, still camera is loaded in advance with a plurality of threshold voltages associated with plural kinds of memory cards. When a memory card is attached onto the camera, a check is made to determine a kind of the card. The judgement may be accomplished, when information of the card types is stored in the non-volatile memory area of the memory card, by reading the memory type therefrom. Alternatively, there may be disposed input means for inputting the memory card type such that the operator inputs data of the card type from the input means, whereby the camera decides the type of the memory card based on the data. Depending on the card type thus determined, a threshold voltage related to the card type is read from the storing means. The voltage check is made by comparing the attained threshold voltage with the voltage of the built-in battery of the memory card.

In accordance with the third aspect of the present invention, only if the kind of the memory card mounted on the camera is identified, a threshold voltage associated with the kind of the memory card is determined to accomplish the battery check of the memory card built-in battery at an installation of the memory card in the camera.

In accordance with a fourth aspect of the present invention, there is provided a digital, electronic, still camera in which image data of an image of a subject shot by said camera is recorded in a memory card having a built-in battery disposed for a data backup purpose comprising input means for inputting a threshold voltage for an alarm of a low voltage of the built-in battery, voltage sensing means responsive to an installation of said memory card in said camera for sensing a voltage of said built-in battery of said memory card, comparing means for comparing the threshold voltage thus inputted from said input means with the battery voltage sensed by said voltage sensing means, and alarming means operative when a result of the comparison conducted by said comparing means indicates that the memory card battery voltage is less than the threshold voltage for issuing an alarm of a low voltage of the built-in battery.

In accordance with the fourth aspect of the present invention, the digital, electronic, still camera includes input means for inputting a threshold voltage for an alarm of a low voltage of the battery integrally disposed in the memory card. In the battery voltage check, a threshold voltage set by the input means is compared with the battery voltage sensed at an installation of the memory card.

In accordance with the fourth aspect of the present invention, since a threshold voltage can be inputted to the camera for a battery check, only when the operator has information of the memory card kind or the threshold voltage, the battery check can be conducted with the threshold voltage suitable for the installed memory card.

BRIEF DESCRIPTION OF THE DRAWINGS

These and other objects and advantages of the present invention will become apparent by reference to the following description and accompanying drawings wherein:

FIG. 3 is a flowchart showing the processing procedure of a built-in battery voltage check conducted in a second embodiment according to the represent invention.

DESCRIPTION OF THE PREFERRED EMBODIMENTS

Figure 1:
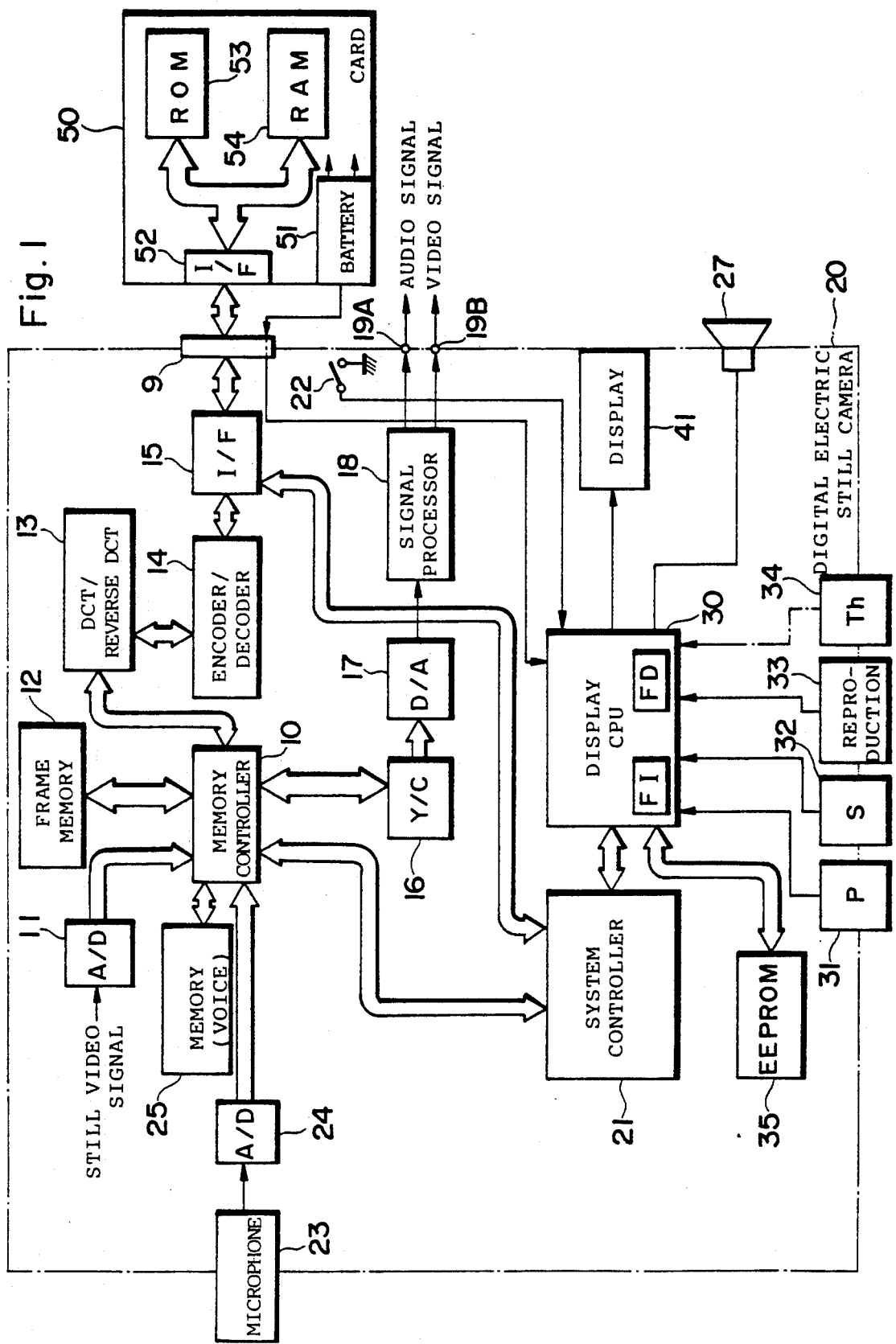
FIG. 1 is a block diagram schematically showing a portion of the electric constitution of a digital, electronic, still camera.

FIG. 1 shows the electronic construction of a digital, electronic, still camera in an embodiment according to the present invention in which image data representative of an image of a subject shot by the camera is recorded on a memory card.

A memory card 50 is detachably loaded in a digital, electronic, still camera 20. When loaded, the memory card 50 is electrically connected via a connector 9 to the camera 20.

The overall operation of the camera 20 is supervised by a system controller 21.

The camera 20 can conduct a battery check on a battery 51 disposed in the memory card 50. The battery 51 supplies power to a random access memory (RAM) 54 of the memory card 50 to achieve a backup function for preservation of the data stored therein. The battery check is accomplished by a display CPU 30 in this embodiment. The display CPU 30 is linked via a bus to the system controller 21. The battery check is carried out in principle at the installation (load) of the memory card 50 in the camera 20. However, the memory card 50 may be checked at a predetermined interval of time after the memory card 50 is installed in the camera 20.

With the memory card 50 mounted on the camera 20, a voltage of the battery 51 is delivered via the connector 9 to the display CPU 30. Moreover, disposed in the camera 20 is a switch 22 for sensing a state that the memory card 50 is installed in the camera 20 and transmitting a sense signal to the display CPU 30. A liquid crystal display 41 and a buzzer 27 are connected to the display CPU 30 for displaying and notifying an alarm condition as a result of the battery check. Namely, when the voltage of the battery 51 of the memory card 50 is insufficient for the memory card 50 to record and to retain image data in the RAM 54, an alarm display is presented on the liquid crystal display 41. The alarm resultant from the battery check is sounded by the buzzer 27. Incidentally, the display 41 is also used to display other information necessary for the camera functions and operations. Provided in the camera 20 are a power switch 31, a shutter release button 32, and a reproduction mode switch 33, which supply inputs therefrom to the display CPU 30. Moreover, an input switch 34 may be disposed for the operator to set a threshold voltage. The threshold voltage thus inputted thereto is also fed to the display CPU 30.

The display CPU 30 is connected to an electrically erasable programmable read-only memory (EE PROM) 35 for storing therein data of battery check threshold voltages (a threshold voltage is a reference voltage to be compared with the voltage of the battery 51 of the memory card 50; when the battery voltage is less than the reference voltage, the recorded image data may possibly be lost) and other data. To conduct the battery check for plural kinds of memory cards, the EE PROM 35 is loaded with a plurality of threshold voltages associated with the plural kinds of memory cards to be used. Moreover, the EE PROM 35 also contains a predetermined threshold voltage which is employed in the battery check when the kind of the memory card 50 installed in the camera 20 cannot be identified.

Contained in a predetermined area of a memory accompanied with the display CPU 30 are a card-in flag FI which is set or cleared in response to an input from the sense switch 22 at an installation of the memory card 50 in the camera 20 and a card battery down flag FD which is set when the battery check of the memory card 50 results in a condition that the voltage of the battery 51 is less than the threshold voltage.

After the power switch 31 is depressed to power the camera 20, when the shutter release button 32 is pushed, a subject is shot by an imaging optical system (not shown) including a charge coupled device (CCD) such that a still video signal representing an image of the subject is converted by an analog-to-digital converter circuit 11 into a digital signal (image data). The image data is sent via a memory controller 10 to be provisionally stored in a frame memory 12.

The camera 20 may also be used to record voices. A voice or an audio signal inputted from a microphone 23 is converted by an analog-to-digital converter circuit 24 into a digital signal (audio data). The audio data is sent via the memory controller 10 to be temporarily loaded in a memory 25.

The image or video data stored in the frame memory 12 is read therefrom in a progressive scanning sequence under the control of the memory controller 10 to be subjected, if necessary, to a field/frame conversion, to be fed to a luminance/chrominance (Y/C) signal processing circuit 16. The Y/C signal processing circuit 16 processes the received image data to create luminance (Y) data and chrominance (C) data, which are transmitted to and are stored in the frame memory 12.

Thereafter, the image data is read from the frame memory 12 to be fed to a discrete cosine transformation (DCT)/reverse DCT circuit 13. This DCT/reverse DCT circuit 13 subjects a received data to a discrete cosine transformation or a reverse discrete cosine transformation. The DCT conversion is a kind of data compression, whereas the reverse DCT conversion is used to expand data compressed through the DCT conversion.

The data resultant from the DCT conversion is delivered to an encoder/decoder circuit 14. The data is encoded i.e. compressed by the encoder/decoder circuit 14. Moreover, the encoded data is expanded by an encoding operation in this encoder/decoder circuit 14. The audio data stored in the memory 25 is also read therefrom by the memory controller 10. The image data thus compressed and audio data are supplied via a card interface 15 to the memory card 50.

Depression of the reproduction mode switch 33 causes the image data to be outputted from the memory card 50 to an output device. That is, image data to be reproduced is transmitted from the memory card 50 via the card interface 15 to the encoder/decoder circuit 14 to be subjected to a data expansion. The expanded data is then fed to the DCT/reverse DCT circuit 13 to undergo a reverse discrete cosine transformation, whereby resultant data is once loaded in the frame memory 12. The data is read therefrom to be delivered via the luminance/chronimance signal processing circuit 16 to a digital-to-analog converter circuit 17 to be converted into an analog signal. The audio data read from the memory card 50 is also delivered via the encoder/decoder circuit 14, the DCT/reverse DCT circuit 13, etc. to the digital-to-analog converter circuit 17 to be converted into an analog signal. These analog signals are supplied to the signal processing circuit 18 to be subjected to a predetermined processing. As a result, an audio signal and a video signal are outputted from output terminals 19A and 19B, respectively.

The memory card 50 includes a read-only memory (ROM), a non-volatile semiconductor memory 53, a random access memory (RAM), a volatile semiconductor memory 54, an interface 52 for receiving various data items from the camera 20 and for transmitting data thereto, and a built-in battery 51 for achieving a backup function for preserving data in the RAM 54. The RAM 54 is loaded with compressed image data delivered from the camera 20.

The ROM 53 is beforehand loaded with data related to the memory card 50. The data includes, as described above, data of compatibility such as the kind, capacity, access time, manufacturer name, pin arrangement, and production date of the RAM 54 and models of electronic apparatuses for use with the memory card 50, and data for the battery check of the backup battery 51. The battery check data may be data directly representing threshold voltages or key data from which threshold voltages can be reduced through computations, table lookup operations, or the like. In addition to the data of threshold voltages to be used to alarm replacement of a battery, data of a lower-limit voltage at which the RAM 54 becomes to be inoperative may be stored. In either case, the ROM 53 is loaded in advance with all data items above or those selected therefrom.

Figure 2:
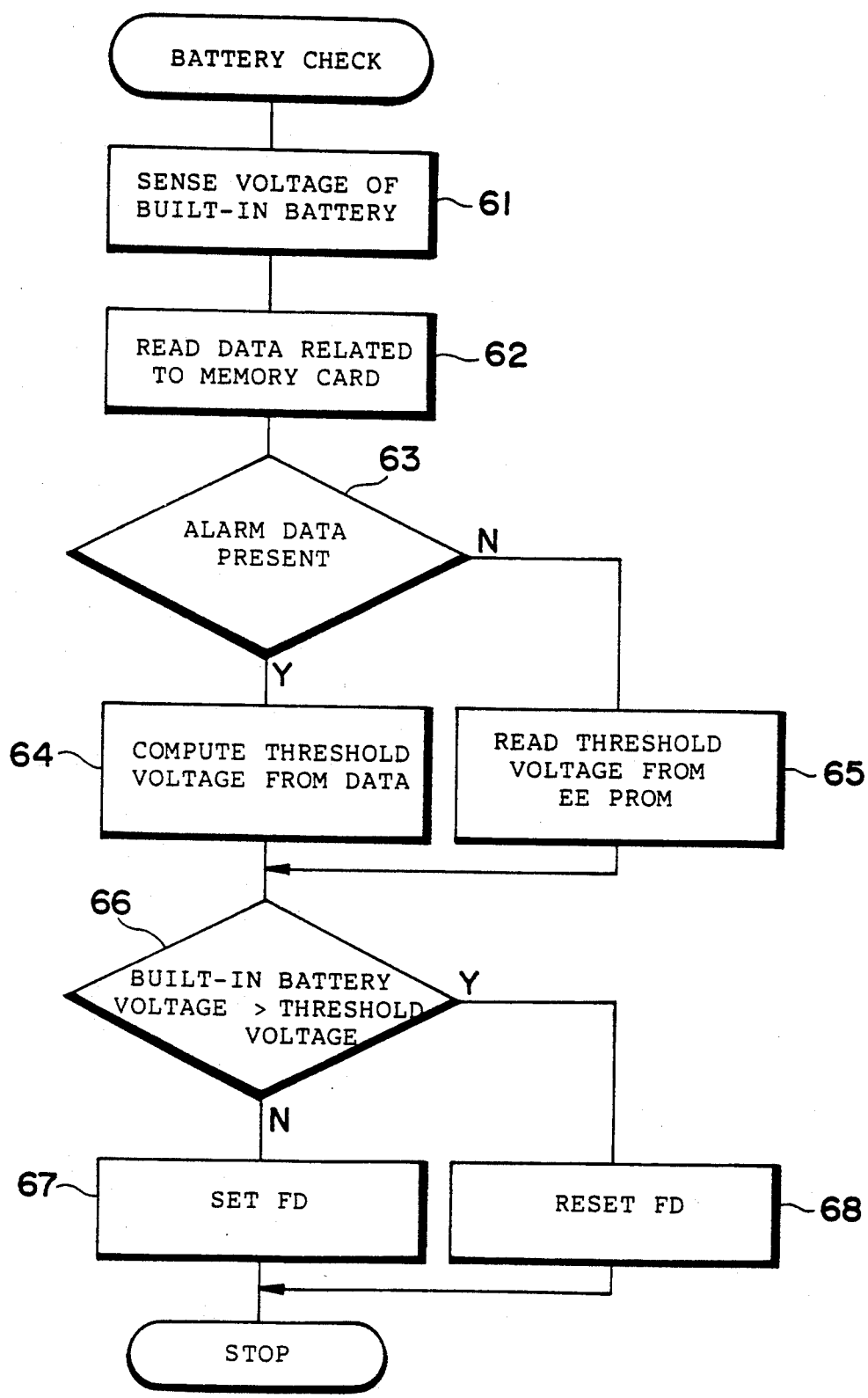
FIG. 2 is a flowchart showing the processing procedure of a built-in battery voltage check achieved in a first embodiment according to the present invention.

FIG. 2 shows the processing procedure of the battery check to be conducted on the built-in battery 51 in the first embodiment.

When the memory card 50 is mounted on the camera 20, the installation sense switch 22 is turned on and then the card in flag FI is set, whereby initiating the battery check processing is started. First, a voltage of the battery 51 is fed to and sensed by the display CPU 30 (step 61). Subsequently, data related to the memory card 50 and beforehand loaded in the ROM 53 is read therefrom under control of the system controller 21. The read data is transmitted via the interface 52, the connector 9, and the interface 15 to the controller 21 so as to be inputted via the bus to the display CPU 30 (step 62).

A check is made to decide whether or not the data read from the ROM 53 of the memory card 50 contains threshold data for the battery check (step 63). If this is the case, the threshold data is adopted in the battery check. When the threshold data does not directly express a threshold voltage, the system generates a threshold voltage therefrom (step 64).

If the threshold data for the battery check is missing in the data attained from the ROM 53, a threshold voltage is read from the EE PROM 35. In this operation, when the data attained from the ROM 53 implies a kind of the memory card 50, the system naturally reads from the EE PROM 35 a threshold value associated with the card kind.

In any cases above, when the threshold voltage is determined, the sensed voltage of the battery 51 is compared with the determined threshold voltage (step 66). If the sensed voltage of the battery 51 is smaller than the threshold voltage, the card battery down flag FD is set (step 67); otherwise, the flag FD is kept reset (step 68).

When the flag FD is set, an alarm is notified by the buzzer 27 and/or the liquid crystal display 41.

In a case where threshold voltages are represented in a plurality of steps, depending on results of comparisons between these threshold voltages and the battery voltage, detailed alarm notifications may be conducted, for example, for a replacement of the battery, for a report of unavailability of the RAM 54, etc.

FIG. 3 shows the processing procedure of the battery check achieved on the battery 51 in the second embodiment. In this embodiment, the ROM 53 of the memory card 50 needs only to be loaded with data at least representing kinds of memory cards to be used. Threshold data is not required to be stored therein for the battery check.

When the memory card 50 is attached onto the camera 20 and the sense switch 22 senses the installation of the memory card 50, a voltage of the battery 51 of the memory card 50 is sensed by the display CPU 30 (step 71).

Data representative of a kind of the memory card 50 is then read from the ROM 53 to be supplied via the interface 52, the connector 9, and the interface 15 to the system controller 21 so as to be delivered therefrom to the display CPU 30.

A setting switch may be disposed to input data representing the kind of the memory card 50 so that the operator supplies therefrom a kind of a memory card 50 installed in the camera 20. In this case, the ROM 53 of the memory card 50 can be dispensed with.

When the kind of the memory card 50 attached onto the camera 20 is thus determined, a threshold voltage associated with the kind of the memory card 50 is read from the EE PROM 35 (step 72). When the kind of the memory card 50 cannot be identified, a predetermined threshold voltage is obtained from the EE PROM 35.

The threshold voltage read from the EE PROM 35 is compared with the battery voltage supplied from the memory card 50 (step 73). If the battery voltage is smaller than the threshold voltage (this renders No in the step 73) the card battery down flag FD is set (step 74). In response thereto, to prevent the image data recorded in the memory card 50 from being lost, an alarm display and an alarm notification are achieved from the liquid crystal display 41 and the buzzer 27, respectively.

If the battery voltage from the memory card 50 is larger than the threshold voltage from the EE PROM 35, the card battery down flag FD is kept reset (step 75). In this situation, the battery 51 develops a sufficient voltage, namely, there exists no fear of loss of the image data and hence the alarm is not issued.

It may also possible to adopt the switch 34 for inputting a threshold voltage such that a threshold voltage is supplied therefrom for the battery check on the battery 51 based on the threshold voltage. In this operation, a threshold voltage corresponding to a kind of a memory card 50 mounted on the camera 20 is supplied by the operator from the input switch 34.

The threshold voltage from the input switch 34 is compared with the voltage of the battery 51 from the memory card 50 by the display CPU 30. If a result of the comparison indicates that the threshold voltage is larger than the voltage of the battery 51, the flag FD is set and an alarm is notified. Otherwise, the flag FD is reset and the alarm notification is not conducted.

The present invention may be applied to not only the above mentioned digital electronic still camera but also a play-back apparatus for reading out image data from a memory card loaded therein and a processor which has at least one of the functions of recording image data in and reading out image data from a memory card loaded therein. The play-back apparatus reads out the digital image data from the memory card to perform processings including D/A conversion on the read image data and outputs a video signal to be fed to a display device or displays an image represented by the image data. The processor also performs some processings on the image data to be recorded in the memory card or read from the memory card. The term "digital electronic apparatus" includes the digital electronic still camera, play-back apparatus and processor.

While particular embodiments of the invention have been shown and described, it will be obvious to those skilled in the art that various changes and modifications may be made without departing from the present invention in its broader aspects.

What is claimed is:

1. A digital, electronic apparatus which records image data in and reads image data from a memory card having a built-in battery disposed for a data backup purpose comprising:
   a memory disposed in the electronic apparatus for storing therein a plurality of threshold voltages respectively associated with plural kinds of memory cards;
   voltage sensing means responsive to an installation of a memory card in a camera for sensing a voltage of said built-in battery of said memory card;
   judging means for determining a kind of said memory card installed in said camera;
   threshold voltage reading means for reading from said memory one of said plurality of threshold voltages associated with the kind of said memory card determined by said judging means;
   comparing means for comparing said one threshold voltage thus read by said threshold voltage reading means with the battery voltage sensed by said voltage sensing means; and
   alarming means operative to when a result of the comparison conducted by said comparing means indicates that the voltage of said built-in battery of said memory card is less than the threshold voltage for issuing an alarm of a low voltage of said built-in battery.

2. A method of alarming a low voltage of a built-in battery disposed in a memory card for a data backup purpose, the memory card being loadable and unloadable on an electronic apparatus, comprising the steps of:
   previously storing in a memory disposed in the electronic apparatus a plurality of threshold voltages respectively associated with plural kinds of memory cards;
   sensing a voltage of said built-in battery of said memory card when said memory card is loaded on the electronic apparatus;
   judging to determine a kind of said memory card loaded in the electronic apparatus;
   reading from said memory a threshold voltage associated with the determined kind of said memory card;
   comparing the threshold voltage read with the battery voltage sensed; and
   issuing an alarm of a low voltage of said built-in battery when a result of the comparison indicates that the voltage of said memory card battery is less than the threshold voltage.

* * * * *